US009189470B2

(12) United States Patent
Kim et al.

(10) Patent No.: US 9,189,470 B2
(45) Date of Patent: Nov. 17, 2015

(54) GENERATION OF EXPLANATORY SUMMARIES

(75) Inventors: Hyun Duk Kim, Champaign, IL (US); Maria G Castellanos, Sunnyvale, CA (US); Meichun Hsu, Los Altos Hills, CA (US); Riddhiman Ghosh, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 206 days.

(21) Appl. No.: 13/485,730

(22) Filed: May 31, 2012

(65) Prior Publication Data
US 2013/0325440 A1 Dec. 5, 2013

(51) Int. Cl.
*G06F 17/27* (2006.01)
*G06F 17/30* (2006.01)

(52) U.S. Cl.
CPC .......... *G06F 17/27* (2013.01); *G06F 17/30719* (2013.01); *G06F 17/30864* (2013.01)

(58) Field of Classification Search
CPC ............. G06F 17/2785; G06F 17/277; G06F 17/30719; G06F 17/30864; G06F 17/3053; G06Q 30/0282; G06Q 30/02
USPC .......................... 704/9; 707/999.003–999.005
See application file for complete search history.

(56) References Cited

U.S. PATENT DOCUMENTS

| | | | |
|---|---|---|---|
| 8,676,795 B1 * | 3/2014 | Durgin et al. | 707/730 |
| 2007/0078845 A1 * | 4/2007 | Scott et al. | 707/5 |
| 2008/0082499 A1 * | 4/2008 | Koski | 707/3 |
| 2008/0114751 A1 * | 5/2008 | Cramer et al. | 707/5 |
| 2008/0215571 A1 * | 9/2008 | Huang et al. | 707/5 |
| 2009/0112892 A1 * | 4/2009 | Cardie et al. | 707/100 |
| 2009/0164266 A1 | 6/2009 | Lakhani et al. | |
| 2009/0193328 A1 * | 7/2009 | Reis et al. | 715/231 |
| 2010/0169317 A1 * | 7/2010 | Wang et al. | 707/736 |
| 2011/0179024 A1 * | 7/2011 | Stiver et al. | 707/728 |
| 2012/0101808 A1 * | 4/2012 | Duong-Van | 704/9 |
| 2013/0151538 A1 * | 6/2013 | Dmitriev et al. | 707/750 |

OTHER PUBLICATIONS

Zhang et al. ("A Generation Model to Unify Topic Relevance and Lexicon-based Sentiment for Opinion Retrieval", In SIGIR '08: Proceedings of the 31st annual international ACM SIGIR conference on Research and development in information retrieval, 2008).*
Ganesan, K et al.; "Opinion-based Entity Ranking"; issue date: 2012; vol. 15; Issue: 2; <http://kavita-ganesan.com/sites/default/files/EntityRank.pdf>.
Cheng, W et al.; "Measuring Opinion Relevance in Latent Topic Space"; Issue date: Oct. 9-11, 2011; pp. 323-330; http/ieeexplore.ieee.org/stamp/stamp.jsp?arnumber=6113131.
Dubey, A. et al.,"A Technique for Summarizing Web Reviews"; issued Dec 9, 2008; pp. 711-717; vol. 1;http://ieeexplore.ieee.org/xpl/articleDetails.jsp?tp=8,arnumber=474053.

* cited by examiner

*Primary Examiner* — Samuel G Neway
(74) *Attorney, Agent, or Firm* — Hewlett-Packard Patent Department

(57) ABSTRACT

A method for generating summaries of text is described. The method includes the step of extracting features from text of text lists from summaries. The explanatoriness of the text is then evaluated, wherein evaluating the explanatoriness of text includes evaluating the features of the text, including at least the step of evaluating the discriminativeness of the features of the text by comparing the text to a first text data set, wherein the first text data set is derived from a topic label. The evaluated text is then ranked based on the explanatoriness evaluation.

15 Claims, 8 Drawing Sheets

GENERATION OF EXPLANATORY SUMMARIES

BACKGROUND

There are a lot of opinionated documents such as blogs, reviews and forum articles on the Web. Because of the huge volume of opinionated documents, automatic summarization techniques have been studied. Some previous opinion summarization techniques focus on predicting sentiment orientation or finding ratings of aspects. For example, to understand opinions about a currently available tablet computer "TabletXYZ", articles, blogs and reviews from websites can be reviewed. Aspects about the tablet computer, such as "OS (operating system)", battery, screen, and price can be used to classify the sentiment orientation of the associated text. Although existing techniques can show the general opinion distribution (e.g. 70% positive and 30% negative), they may not provide detailed reasons about those opinions. Thus, reviewing all of the classified texts may still be required.

In some cases, automatic summarization techniques can be helpful to reduce the length of the text of the opinionated document. However, because many automatic summarization techniques are based on "popularity" (frequently mentioned information is important), the output summary can be a repeat of already known information. For example, for the summary request for "positive opinion about TabletXYZ OS", the output summary might be "OS is good." Such an output summary is redundant with the initial summary request and does not provide any additional information.

BRIEF DESCRIPTION OF DRAWINGS

The figures depict implementations/embodiments of the invention and not the invention itself. Some embodiments are described, by way of example, with respect to the following Figures.

The drawings referred to in this Brief Description should not be understood as being drawn to scale unless specifically noted.

DETAILED DESCRIPTION OF THE EMBODIMENTS

For simplicity and illustrative purposes, the principles of the embodiments are described by referring mainly to examples thereof. In the following description, numerous specific details are set forth in order to provide a thorough understanding of the embodiments. It will be apparent, however, to one of ordinary skill in the art, that the embodiments may be practiced without limitation to these specific details. Also, different embodiments may be used together. In some instances, well known methods and structures have not been described in detail so as not to unnecessarily obscure the description of the embodiments.

Due to the large amount of opinionated data available, opinion mining and summarization techniques have become increasingly important. Many summarization techniques have focused on predicting sentiments of entities and aspect-based rating for the entities. Sentiment analysis tools give the popularity of opinionated text or polarity distribution but not always the underlying reasons why these opinions are positive or negative. Thus, even if sentiment analysis tools are used, the end user may still need to read through the opinionated text collection to find out why people expressed those opinions.

To solve this problem, we propose an automated explanatory opinion summarization generation technique which provides more detailed explanatory summary information to help readers to better understand the reasons behind the sentiments. Thus for example, instead of providing the output summary "OS is good" in response to the summary request for positive information about TabletXYZ operating system, more explanatory summary sentences such as "OS supports multi-tasking well" will be provided to help the reviewer understand the reasons of the opinions. Thus a goal of the explanatory summary is that it is not only relevant to the given topic label, but it is also not directly inferable (redundant) from the given topic label. The explanatory summarization method selectively finds more informative content using syntactic and lexical analysis and discriminative points from for example, the other sentiment orientation or comparable subtopics.

Figure 1:
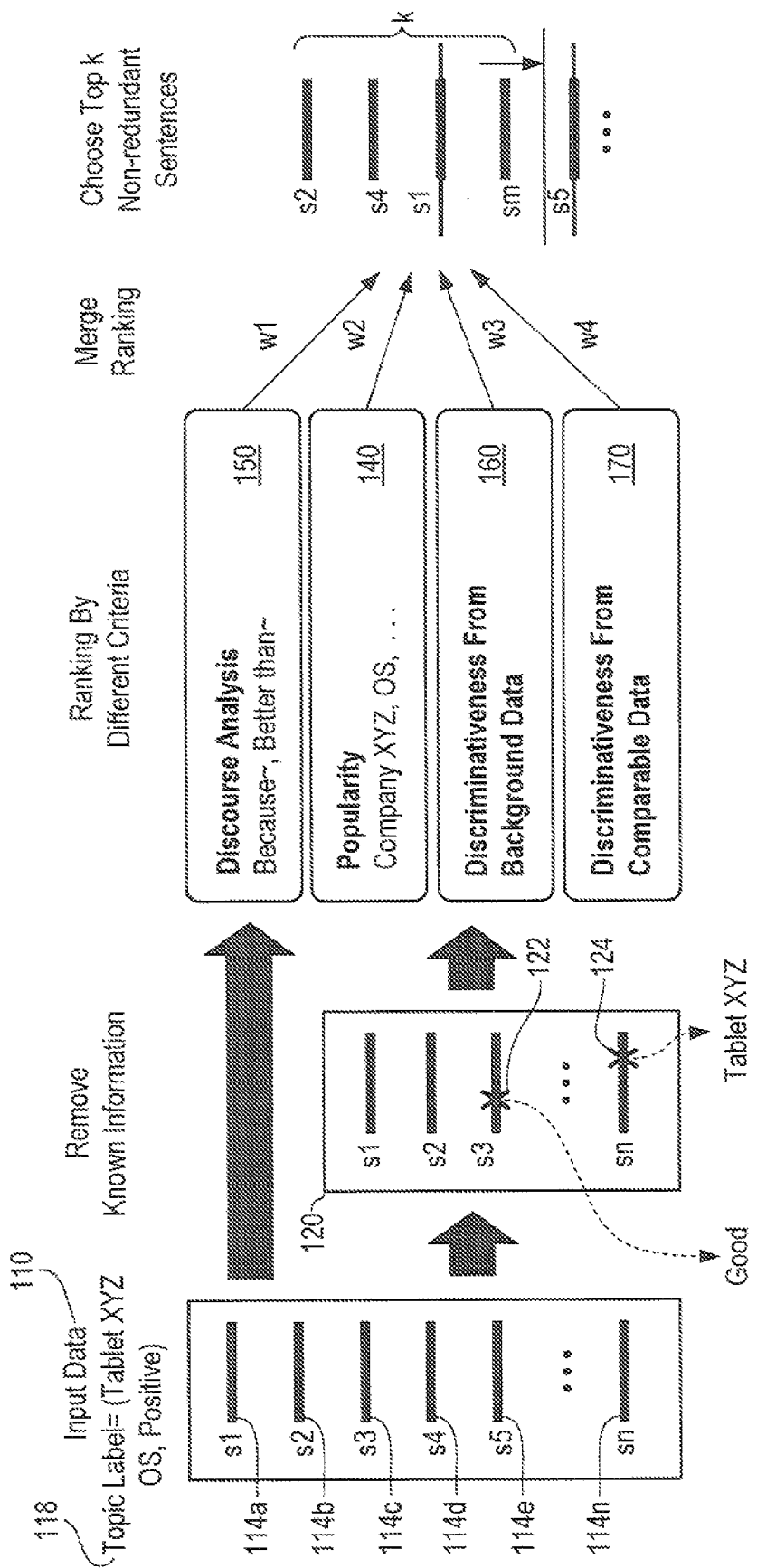
FIG. 1 shows a process overview of a method of generating explanatory summaries from opinionated data according to an example of the invention.

FIG. 1 shows a process overview of a method of generating explanatory summaries from opinionated data according to an example of the invention. Referring to FIG. 1, input data 110 for this method includes: (1) opinionated text data and (2) topic label 118 from which explanatory summaries will be generated. The opinionated text data can be deconstructed into a plurality of "sentences" 114*a-n* that provide text about a topic.

For the case where the input data 110 includes opinionated text data, the input is a list of texts which may include opinions about the given topic. The opinionated text can come from various sources and could be from sources, including but not limited to: sentences from review articles from the web, opinion data from a retail website or any other output of any opinion mining source. The opinionated text data can be extracted from unstructured or structured text data or a combination of the two data types.

The input data 110 includes a topic label from which explanatory summaries will be generated. A topic label is a set of words which describe the input sentences. Description 118 shows an example of a topic label from which explanatory data will be generated. The topic label may include different dimensions like "domain", "product name", "sentiment orientation", or "subtopic/aspect". For example, if we want an explanatory summary for summarizing the reasons for the "positive" opinions about the TabletXYZ's operating system, the topic label would be (TabletXYZ, OS, Positive). For the topic label example 118, the topic label 118 includes three dimensions ("product name", "subtopic", "sentiment orientation"). For the example topic label 118—(TabletXYZ, OS, Positive) is the "topic label", tablet computers is the "domain", TabletXYZ is the "product name", OS is the "aspect" or "sub-topic", and Positive would be the "sentiment orientation".

A topic label can be considered to be opinionated when one of the dimensions is a "sentiment orientation". The example in topic label 118 can be referred to as an opinionated topic as it includes the sentiment orientation "Positive". If we want to provide an explanatory summary for the reasons for the "negative" opinion about the TabletXYZ OS, the topic label in the input data 110 would be (TabletXYZ, OS, Negative). If the topic is not "opinionated", then no sentiment orientation is included in the topic label. Thus if we wanted an explanatory summary for summarizing the reasons (whether positive or negative) about the TabletXYZ's operating system, the topic label would be (TabletXYZ, OS, Positive).

The method of generating explanatory summarizations can be described as a computational problem where the input is described in one example as (1) a topic T as described by a phrase (e.g. a camera model), (2) an aspect A as described by a phrase (e.g., "picture quality" for a camera), (3) a polarity of sentiment P (on the specified aspect A of the topic T), which is either "positive" or "negative" and (4) a set of opinionated sentences $O=\{o_1, \ldots, o_n\}$ of the sentiment polarity. For example, if we want to summarize positive opinions about TabletXYZ OS, our input would be T="TabletXYZ", A="OS", P="positive", and a set of sentences with positive opinions about the OS of TabletXYZ, O.

Given T, A, P and O as input, the desired output is an explanatory opinion summary S, which is a subset of sentences of O, i.e., $s=\{s_1, \ldots, s_m\} c \subset O$ such that every $s_i$ is an explanatory sentence that gives a specific reason why the reviewer has the particular polarity of sentiment, and the summary would fit a display with k characters, i.e., $\Sigma_{i-1}^{m}|s_i| \leq k$, where $|s_i|$ is the length of the sentence $s_i$. Unlike some summarization methods where the problem formulation is often to extract k sentences, in one example, the method extracts as many sentences as can fit in a window of k characters.

Before feature extraction, in one example, additional pre-processing steps may be applied to the input data 110 to eliminate words that are not useful in determining explanatoriness. In one example, a preprocessing stop word technique is applied to the data 110 to eliminate any stop words. Stop words are words that provide little informative content e.g. articles, pronouns, etc. and because they are not very informative, these words may be eliminated from the input data 110. In another example, the preprocessing step includes application of a stemmer technique to unify different forms of word variations. For example, going to the infinitive form of the verb or eliminating plural forms of the text are both methods of achieving a more unique form of the input. Application of a stemmer pre-processing step eliminates word which are effectively duplicates (i.e. like/likes/liked, run/runs/running, etc.) by simplifying to a root word, thus providing a list of text that is more efficient in determining explanatoriness. In one example, the words eliminated from the input data 110 by these pre-processing techniques are not used in the ranking evaluations, however, the words that are eliminated in the pre-processing steps, may be included in the final explanatory summary so that the text appears in the original form that it was input for purposes of readability.

Sentences and/or text from the list of text 114a-n in the input 110 is processed to extract features. Here the term feature is used similarly to how it is used in the machine learning context—where a feature is some characteristic. Often the characteristic is associated with a target and the feature is used in combination with the target to make a decision. Features can be but are not limited to the following text structures: unigrams (i.e., single words), n-grams (multi-word phrases), sentences. A decision needs to be taken on which text structure or combination of text structures is preferred (i.e., gives better results).

Once the input 110 is decomposed into its features, we can evaluate the explanatoriness of each feature by using several criteria, including but not limited to the following criteria: whether the feature is known, what ranking the feature has based on its popularity, what ranking the feature has based on discourse analysis, what ranking the feature has based on its discriminativeness from background data, and what ranking the feature has based on its discriminativeness from comparable data. All of the aforementioned criteria are not required for implementation of the invention, however, adding additional non-overlapping criteria can improve the quality of the explanatory summaries. In addition, the aforementioned criteria list is not necessarily a complete list of criteria for evaluation of explanatoriness and other criteria may be added or removed from the list dependent upon the desired results.

As previously stated, once the input 110 is decomposed into its features, we can evaluate the explanatoriness of each feature. One technique for evaluating the explanatoriness of the feature is to evaluate whether the feature is "known". If the feature or the dimensions in a topic is already known, it is not considered to be very informative. For example, for the topic (TabletXYZ, OS, Positive), the words "TabletXYZ", "OS" and general positive opinion words (e.g. "good") are already known. As they are already known for this topic, the words "TabletXYZ", "OS" and "good" are considered to be not very informative for this topic, and thus their score with respect to this evaluation criteria should be very low.

As we do not want to repeat information that is already known for the topic, we can ignore known information in our scoring processes. Referring to FIG. 1, the process of evaluating whether a feature is known is represented by 120. When information is known, we may want to remove it from our input list 110. Referring back to our previous example, where the words "TabletXYZ", "OS", and "good" were not considered to be informative, we want to remove them from the input list. Thus, the sentence s3 (114c) has the word "good" 122 removed from it as it is not informative. Similarly, the sentence sn (114n) has the word "TabletXYZ" 124 removed from it as it is not informative. Removal of the word is indicated by the letter "x" at the location in the sentence where the word was removed. The removed words would not be used in ranking evaluation.

As previously stated, once the input 110 is decomposed into its features, we can evaluate the explanatoriness of the text with respect to discourse analysis or alternatively with respect to each feature with respect to popularity and discriminativeness. The step of evaluating the text and/or features includes the step of determining an explanatory score and ranking (steps 232, 236, 240, 244) the text and/or features based on the explanatory score.

Figure 2:
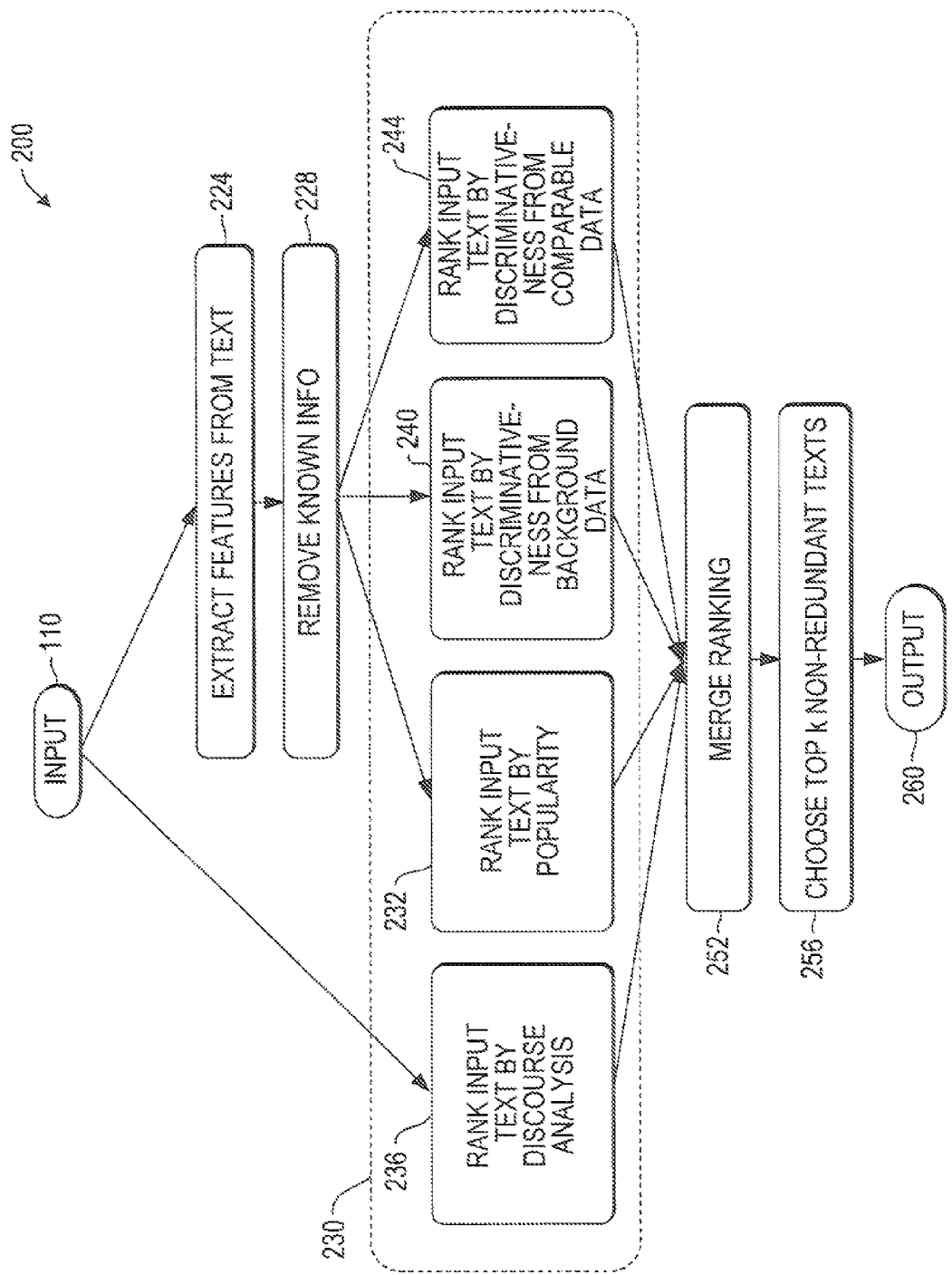
FIG. 2 shows a flow diagram for a method of generating explanatory summaries from opinionated data according to an example of the invention.

One of the techniques available for evaluating explanatoriness is determining what the ranking of the feature is based on its popularity. Ranking by popularity 120 is one of the components of the process shown in FIG. 1 and is correspondingly shown as one of the steps in the method shown in FIG. 2. FIG. 2 shows a method of generating explanatory summaries that corresponds to the overall process shown in FIG. 2. Specifically, the step of ranking the input text by popularity is shown as step 232 in the method 200. Further, the details of the ranking process based on text popularity are shown in the flowchart shown in FIG. 3.

Figure 3:
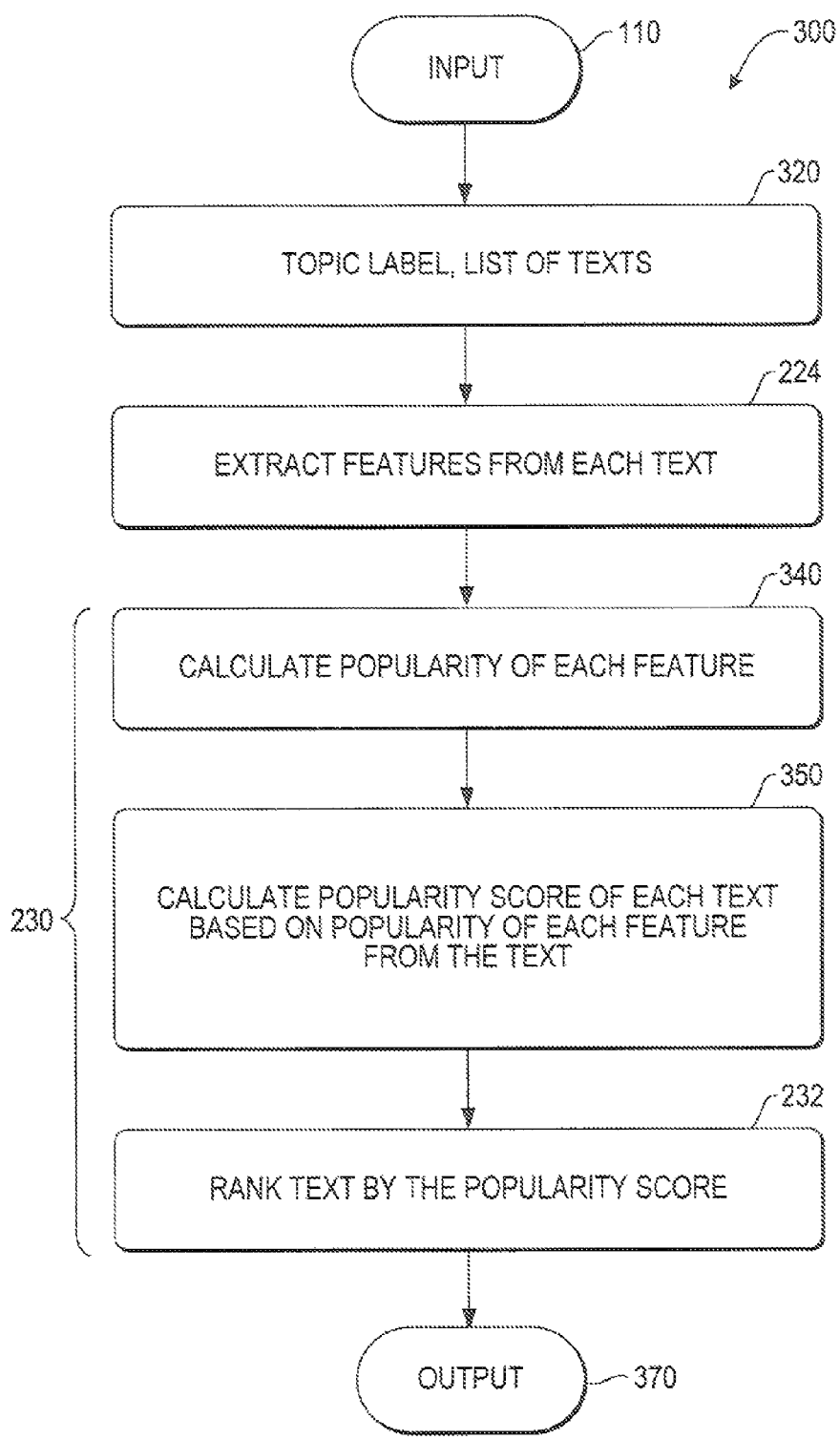
FIG. 3 shows a flow diagram for a method of evaluating and ranking input text by popularity according to an example of the invention.

FIG. 3 shows a flow diagram for a method of evaluating and ranking input text by popularity according to an example of the invention. In one example, it is desirable to show representative information from input texts, we use popularity of information as one of our signals as to the explanatoriness of the input text. For example, if the word 'multi-tasking' frequently occurs in the text listed in the input 110, the word 'multi-tasking' will be determined to be more explanatory than other less frequently occurring words.

FIG. 3 shows a flow diagram for a method of evaluating and ranking input text by popularity according to an example of the invention. The flow diagram in FIG. 3 corresponds to the steps 224, 230 and 232 shown in the overall process shown in FIG. 2. The process 200 shown in FIG. 2 includes the steps of: extracting features from text of text lists from opinion summaries (224); evaluating explanatoriness of text (step 230), wherein evaluating the explanatoriness of text includes evaluating the features of the text, including at least the step of evaluating the discriminativeness of the features of the text by comparing the text to a first text data set, wherein the first text data set is derived from a topic label; and ranking the text based on the explanatoriness evaluation (step 252).

The example shown in FIG. 2 shows four different techniques that may be used for evaluating the explanatoriness of the text based on the topic label. The four techniques are: popularity, discourse analysis, discriminativeness from background data set, and discriminativeness from comparable data set. Although these four data sets are shown, the described method is not limited to these four techniques and other techniques which evaluate the explanatoriness of text can be added to the described method or alternatively, a subset of the described techniques (for example, popularity and discriminativeness of input text from background data) could be used.

In one example, the input text is evaluated for explanatoriness by each of the four different evaluation techniques. During evaluation by the four evaluation techniques, the input text is given an score based on each evaluation (a popularity score (step 350), a discourse analysis score (step 440), a discriminativeness score based on comparison to a data set (step 550) where the data set the input data set is being compared to is a background data set (540b) or a comparable data set (step 540e). Based on the evaluation score, the text is ranked (steps 232, 236, 240, 244).

Referring to FIG. 3, an input topic label and/or a list of text is generated from the input data set 110. From the lists of text in the input, features are extracted from each topic label or text list (step 224). After features are extracted from the list of texts, the explanatoriness of the text is evaluated (step 230) based on popularity. Referring to the method in FIG. 3, the evaluation step includes calculating a popularity score for each feature (step 340). Then based on the popularity score of each feature in the text, a popularity score is calculated for each text (step 350). Then the texts are ranked according to their popularity score (step 232). This popularity score is then output (step 370). The output is merged with the other rankings (step 252) and is used in determining which features are used in the final output (the explanatory summary).

As previously stated, once the input data 110 is decomposed into its features, we can evaluate the explanatoriness of each feature by using several criteria. In the example shown in FIG. 4, evaluating the explanatoriness of each feature is based on evaluating the feature based on the discourse analysis. Ranking based on the discourse analysis of the text (step 236) is one of the components of the process shown in FIG. 1. Further details of evaluating and ranking the input text by discourse analysis is shown in FIG. 4.

Discourse analysis is the process of parsing text and in the described method, the process of parsing text (typically a sentence) helps to determine and extract explanatory words. Labels obtained from discourse parsing, give clues to find text with a high likelihood of containing detailed information. Discourse analysis techniques are used to parse and analyze the syntax structure and lexical clues (e.g. 'because') of the sentence. Consider for example, the input text sentence "TabletXYZ OS is good because it can support multi-tasking well". Using discourse analysis techniques, a label may be assigned. For example, if based on the discourse analysis techniques—it is found that the input text sentence is explanatory, then the label 'Explanation' (i.e., reason) could be assigned to text.

The label 'Explanation" is just one of the labels that may be assigned during discourse analysis. For example, the result of discourse parsing can output or assign labels including, but not limited to the following list: 'Elaboration', 'Attribution', 'Temporal', 'Enablement', 'Condition', 'Explanation', 'Contrast', 'Background', 'Joint', 'Comparison', 'Cause', 'Manner-Means', 'Topic-Comment', 'Evaluation', 'Consequence', 'Summary', 'Cause-Result', 'Analogy', 'Span', 'Same-Unit', 'Textual Organization', 'Question-Answer-N', 'Otherwise'. In one example, labels are selected from a list of labels (such as the previous list) where the selected labels have a grammatical construction believed to be more likely to be indicative of explanatoriness. In one example, the labels indicative of explanatoriness are: 'Elaboration, 'Explanation', 'Background', 'Condition', 'Cause', 'Enablement', 'Cause-Result', 'Consequence', 'Comparison', and 'Contrast'. Labels considered to be indicative of explanatoriness can be scored higher when evaluating explanatoriness. Thus, we can selectively use discourse labels which usually contain detailed reasons of opinions for ranking in order to determine which text is likely to provide text which should be used in the output explanatory summary due to its high ranking based on explanatoriness.

Figure 4:
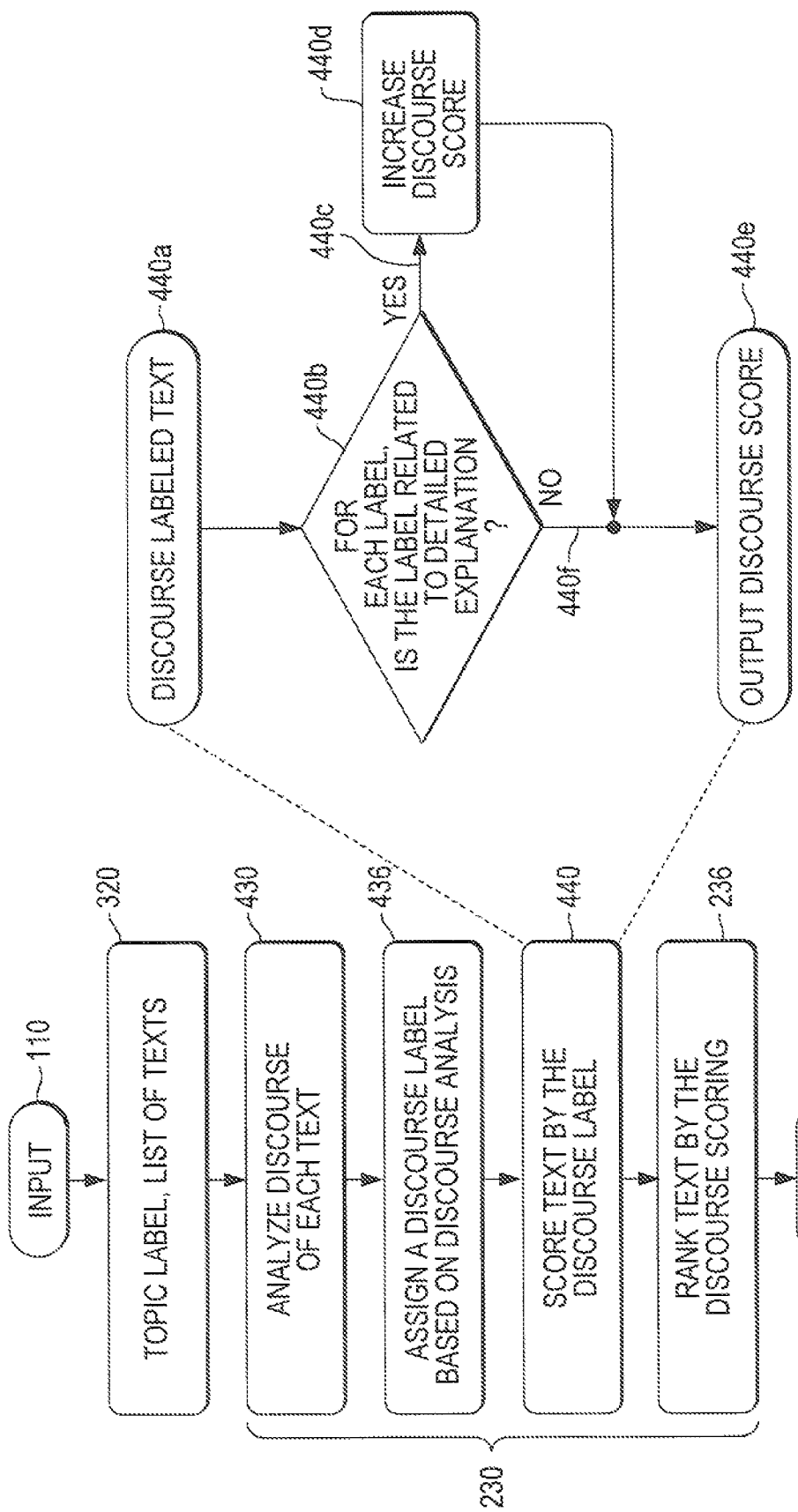
FIG. 4 shows a flow diagram for a method of evaluating and ranking input text by discourse analysis according to an example of the invention.

FIG. 4 shows a flow diagram for a method of evaluating and ranking input text by discourse analysis according to an example of the invention. The described method uses a list of texts and an input topic label (step 320) as input. From the list of text, discourse analysis techniques are applied to the text (step 430). Because the entire original sentence is used for discourse parsing, the steps of extracting features from the text (step 224) and removing known information (step 228) do not need to be applied. Based on the application of the discourse analysis technique—a label can be assigned. Based on the discourse label assigned, the text corresponding to the discourse label is assigned a score (step 440).

The process for determining the score for the text associated with the discourse label (step 440) is detailed in steps 440a-d. The input for this process is the discourse labeled text (step 440a). For each discourse label, a determination is made as to whether the discourse label is related to a detailed explanation (step 440b). If the discourse label assigned to the text is related to a detailed explanation (440c), then the discourse score is increased (step 440d). If the discourse label assigned to the text is not related to a detailed explanation (440f), then the discourse score is not increased—it is simply output (step 440e) with no change to the current score. In one example, different scoring values may be assigned to different Labels. For example, if batteries for the Tablet XYZ are having problems and there is a high concern of fire, text having the label "Consequence" where consequence is fire may receive a higher score than other labels as it would be considered to be more discriminative.

As previously stated, once the input 110 is decomposed into its features, we can evaluate the explanatoriness of each feature by using several criteria. Another criteria used for evaluating the explanatoriness of each feature is determining the discriminativeness of the feature. Ranking by discriminativeness 160, 170 corresponds to two components of the process 160, 170 shown in FIG. 1 and is correspondingly shown as two steps 240, 244 in the overall process shown in FIG. 2. Specifically, the step of ranking the input text by discriminativeness by a comparison of the input to a background data set is show n step 240 in the method 200 and the step of ranking the input text by discriminativeness by a comparison of the input to a comparable data set is shown step 240 in the method 200. Further, the details of the ranking process are shown in the flowchart shown in FIGS. 5A and 5B where FIGS. 5A and 5B both show flow diagrams for a method of evaluating and ranking input text based on discriminativeness according to an example of the invention.

The described method provides two examples of ranking based on discriminativeness. In the first example shown in FIG. 5A, discriminativeness is determined by comparing the input data with a background data set. In the second example shown in FIG. 5B, discriminativeness is determined by comparing input data with a comparable data set. In both of the examples shown in FIGS. 5A and 5B, a comparison is occurring. The comparison occurs between the data in the input data set 110 corresponding to the topic label 118 and data in an data set that corresponds to a modified topic label. For example, the modified topic label might be a "relaxed" topic label or a "replacement" topic label where for example a dimension in the original topic label may be replaced. If a feature appears in one set and not another set (or more frequently appear in one set than another set), then the feature where the difference occurs can be considered to be more discriminative and should be ranked more highly.

In one example, the input data set is a topic label. Background data set can be obtained by topic relaxation. If there is more than one dimension in the topic label, we can "relax" the condition on one of the dimensions for example. In one example, relaxing a topic label is achieved by eliminating a dimension from the topic label. For the topic label (TabletXYZ, OS, Positive), an example of a relaxed topic label would be (TabletXYZ, OS). For the relaxed topic label (TabletXYZ, OS) the condition 'Positive' of the sentiment orientation dimension is relaxed. Another example of a relaxed topic label would be (OS, Positive). For the relaxed topic label (OS, Positive) the condition 'TabletXYZ' on the product dimension is relaxed compared to the original topic label (TabletXYZ, OS, Positive). Another example of a relaxed topic label would be (TabletXYZ, Positive) where the condition 'OS' on the aspect dimension was relaxed.

For each dimension, we can even further relax the topic label. For example, (TabletXYZ) could be relaxed to 'Tablet' topic. For product entries, we can find product hierarchies in many review websites. However, the problem associated with relaxing the topic label further is that it increases the breadth of input that matches the topic label, increasing the difficulty of providing informative data.

By comparing background data with the input data set 110, we can evaluate discriminativeness of the information in the data set. For example, if our topic label is (TabletXYZ, OS, Positive), general information about TabletXYZ, OS, (TabletXYZ, OS) can be one of the background data set. If some text occurs frequently in the (TabletXYZ, OS, Positive) text set, but not in (TabletXYZ, OS), we can consider that it contains information that is discriminative. In one example, we would have opinionated sentences about one topic, T, and aspects and sentiments can be classified by the existing opinion mining techniques. That is, we would always have background at least within topic T.

Figure 5A:
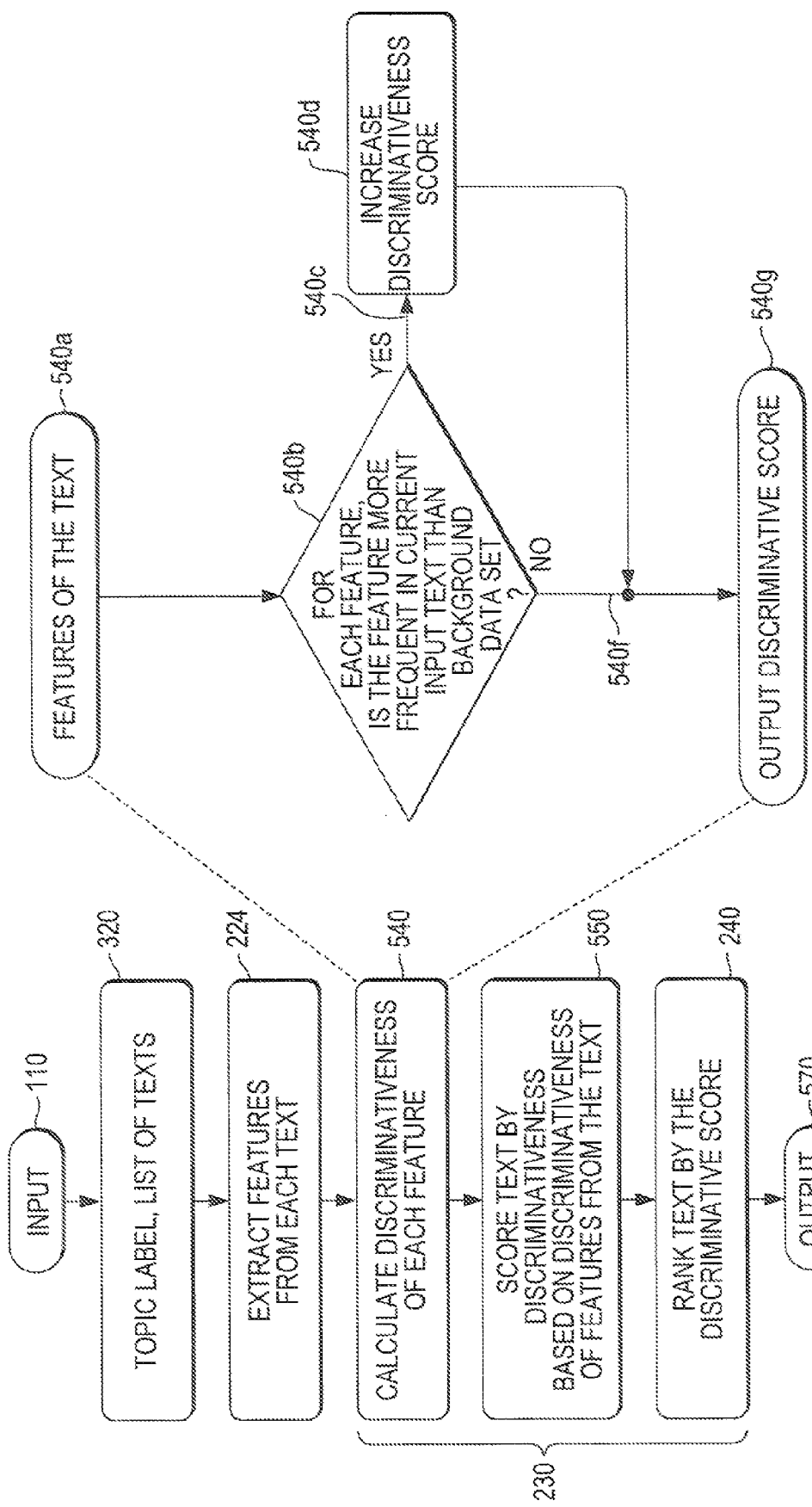
FIG. 5A shows a flow diagram for a method of evaluating and ranking input text based on discriminativeness from background data according to an example of the invention.
Figure 5B:
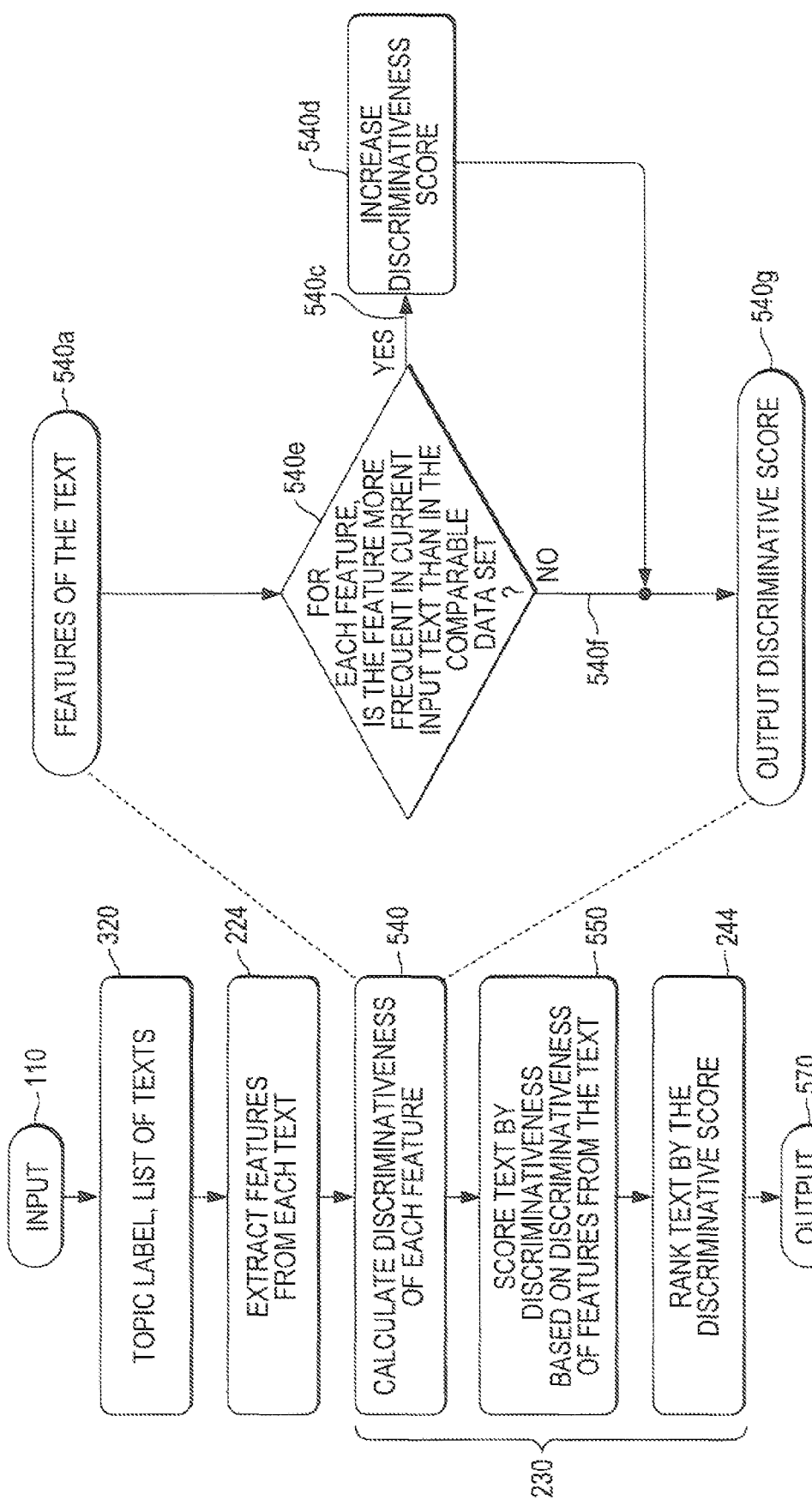
FIG. 5B shows a flow diagram for a method of evaluating and ranking input text based on discriminativeness from comparable data according to an example of the invention.

FIGS. 5A and 5B show flow diagrams for a method of evaluating and ranking input text by determining discriminativeness according to an example of the invention. The flow diagrams in FIGS. 5A and 5B corresponds to steps 224, 230, 240 and 244 shown in the overall process shown in FIG. 2. The described method uses as input a list of texts and an input topic label (step 320) as input 110. From the lists of text in the input, features are extracted from each topic label or text list (step 224). Discriminativeness analysis techniques are applied to the features to calculate the discriminativeness of each feature (step 540).

The process for determining the discriminativeness of each feature in the text (step 540) is detailed in steps 540a-g. The input for this process are the features in the text (step 540a). Referring to FIG. 5A, for each feature, a determination is made as to whether the feature is more frequent in the current input text than the background "relaxed" data set (step 540b). If the feature is more frequent in the current input (540c), then the discriminativeness score for that feature is increased (step 540d).

As previously stated, the described method provides two examples of ranking based on discriminativeness. In the first example shown in FIG. 5A, the discriminativeness is determined by comparing input data to a background data set. In the second example shown in FIG. 5B, discriminativeness is determined by comparing input data with a comparable data set. In one example, the input data set is a topic label. By comparing comparable data to the input data set, we can evaluate discriminativeness of the information.

By comparing data in a comparable data set to the input data set, we can evaluate discriminativeness of the information. Comparable data sets can be found by topic replacement. If there is more than one dimension in the topic label, replacing one of the dimensions with a dimension will result in a comparable data set. For example, if our topic label is (TabletXYZ, OS, Positive), we can compare it to the comparable data set topic label (TabletXYZ, OS, Negative). The basic method of comparison to background data is similar to the method of comparison to comparable data for finding discriminativeness from background data. If any information frequently occurs in (TabletXYZ, OS, Positive) text set, but not in (TabletXYZ, OS, Negative), that information is considered to be discriminative.

Examples of comparable data are discussed. For example, if the topic label includes sentiment orientation, replacing it with the opposite sentiment determines a comparable data set (in this case, those with negative semantic orientation about TabletXYZ, OS). If the topic label includes an aspect (e.g. OS) specification, other aspects (e.g. Design, Battery, Price) of the same entity (i.e., TabletXYZ) can be comparable topics. For product name (e.g. TabletXYZ), other products in the same domain (e.g. TabletABC in tablet domain) would be comparable topics.

By comparing the input data set with background data sets and comparable data sets, it is possible to identify more discriminative information about the given topic for the explanatory summary. Another benefit of using the discriminativeness signal is that we can exclude opinions that are irrelevant for the topic label. There may be texts in input texts that include some irrelevant information about the topic label. For example the text 'TabletXYZ has long battery, cool design, but high price' could be included in the (TabletXYZ, Battery, Positive) text set if we use 'sentence' as a unit even though the input text includes information about design and price. In this case, the described method can determine that the information about design and price is not informative because it would be less discriminative when we compare the comparable data sets, (TabletXYZ, Design, Positive) and (TabletXYZ, Price, Positive).

Comparable data sets can be found by topic replacement. If there is more than one dimension in the topic label, we can replace one of the conditions. For example, if the topic label includes sentiment orientation, replacing it with the opposite sentiment determines a comparable data set (in this case, those with negative semantic orientation about TabletXYZ OS). If the topic label includes an aspect (e.g. OS) specification, other aspects (e.g. Design, Battery, Price) of the same entity (i.e., TabletXYZ) can be comparable topics. For product name (e.g. TabletXYZ), other products in the same domain (e.g. TabletXYZ in tablet domain) would be comparable topics.

The flow diagram in FIG. 5B corresponds to the steps 224, 230, 240, 244 shown in the overall process shown in FIG. 2. The described method uses as input a list of texts and a topic label (step 320) as input 110. From the lists of text in the input, features are extracted from each topic label or text list (step 530). Discriminativeness analysis techniques are applied to the features to calculate the discriminativeness of each feature (step 224).

The process for determining the discriminativeness of each feature in the text (step 540) is detailed in steps 540a-g. The input for this process are the features in the text (step 540a). For each feature, a determination is made as to whether the feature is more frequent in the current input text than the comparable data set (step 540e). If the feature is more frequent in the current input data set (540c), then the discriminativeness score for that feature is increased (step 540d). Otherwise, the discriminativeness score is just output (step 540g) without any modification.

As previously stated, criteria other than popularity 140, discourse analysis 150, discriminativeness from background data 160, and discriminativeness from comparable data 170, may be used in evaluating the explanatoriness. For example, the length of the text (not shown) may be used as an indicator of the explanatoriness as longer sentences tend to include an explanation. For this example, another criteria labeled 'Rank input text by length' would be added to the process flow similar to the criteria 232, 236, 240, and 244. In one example, the longer the length of the sentence, the higher the score and thus the higher the ranking of the text. In one example, other criteria may reflect length feature so adding length criterion can be an optional. Whether length is added as an additional criterion may depend on how the other criteria is calculated. For example, if we define popularity of sentence=sum of each feature's popularity, then for this case, if a sentence having a longer length and more features tend to have higher popularity.

After the list of texts is evaluated and given an explanatoriness score for its explanatoriness using different criteria such as popularity 140, discourse analysis 150, discriminativeness from background data 160, and discriminativeness from comparable data 170, the list of texts are ranked (steps 232, 236, 240, 244) based on the explanatoriness score. The ranked list of texts is merged (step 252), in one example into a single list. In one example, the lists of texts are merged by uniformly ranking the lists of texts. In an alternative example, the ranked texts can given different weights. The letters w1, w2, w3, and w4 are representative of the different weights that could be assigned to the different criteria. For the case where the criteria are uniformly ranked w1=w2=w3=w4.

Texts are selected from the higher ranking texts up to the desired length. In one example, a top k method is method is used. An explanatory summary can be generated by taking a maximum number of the most explanatory opinion (most highly ranked) to fill in the summary constrained by the specified summary length. Given an explanatory scoring function E(s), which can score a sentences based on how well the sentence explains the sentiment polarity of opinions, an explanatory summary can be generated by computing the explanatoriness scores of all the sentences in O, i.e., $E(o_1)$, $E(o_2), \ldots, E(o_n)$, ranking all the sentences in O in descending order based on $E(o_i)$ and then where S={ }, repeatedly adding sentences from L to S in the ranked order until no additional sentence can be added to S without violating the constraint $\Sigma_{s \in S} |s| \leq k$.

Texts are mainly related by explanatoriness, so top ranked sentences can share same or similar information. In one example, when text is selected we find non-redundant texts. One method of selecting non-redundant texts is to select one text first, then iteratively select the next sentence by checking if the information on the next candidate text is already included in the already selected texts.

An example of an output explanatory summary 260 is described. Say, for example the end user is interested in getting a summary of the negative information about Company XYZ's audio player (ProductABC) case. In this case, one topic label might be (CompanyXYZ, ProductABC, Case, Negative). Output comments in the summary might be: i) The case is strong and stylish, but unfortunately lacks a window (now a big deal). ii) The case is too small—it took me like a half hour just to get this monstrosity to fit in its cage. In this case, the extracted sentences provided in the output explanatory summary reach our goal—they show detailed reasons of negative opinion about the topic, 'lack of a window' and 'too small'.

Figure 6:
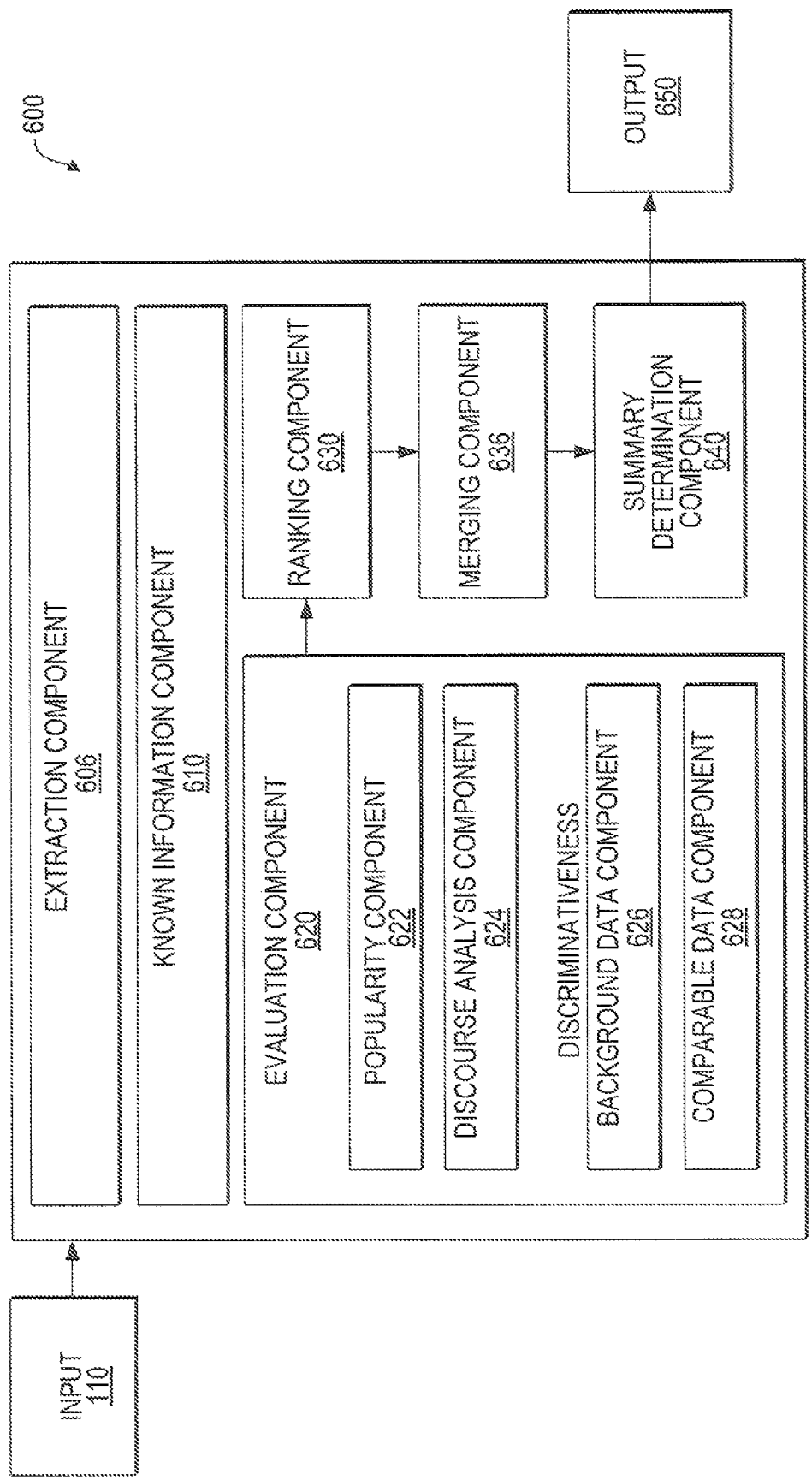
FIG. 6 shows a system for generating explanatory summaries from opinionated data according to an example of the invention.

FIG. 6 shows a system 600 for generating explanatory summaries from opinionated data according to an example of the invention. Input 110 in the formats described (topic label, list of texts) is input into the system 600. Features from the text or lines of text from the list of texts are extracted by the Extraction Component 606. In one example, the system includes a Known Information Component 610 which is used to extract information already known so that it is not ranked or further processed.

The system further includes a Evaluation Component 620. In one example, the Evaluation Component includes a Popularity Component 622 that is used to rank the input text by popularity according to the method 232 shown in FIG. 3. In the example shown in FIG. 6, the Evaluation Component further includes a Discourse Analysis Component 150. The Discourse Analysis Component 150 parses and analyzes the syntax structure and lexical clues of the sentence and from this analysis assigns a label used in determining the ranking of the input text. The Discriminativeness Component 625 is used to evaluate the discriminativeness of the text according to the methods 240, 244 and the method shown in FIG. 5. The Discriminativeness Component includes a Background Data Component 626 and a Comparable Data Component 628. Both the Background Data Component 626 and Comparable Data Component 628 evaluate features of the text.

The output from the Evaluation Component is used by the Ranking Component 630 to establish the ranking of the text or features. In one example, the ranking is based on the score output by the Evaluation Component 620. The rankings from the Popularity Component 622, Discourse Analysis Component 150, and the Discriminativeness Component 625 are merged in the Merging Component 636. Based on the rankings after the merger, the acceptable summary length, whether there are redundancies in the text, etc., the Summary Determination Component determines which text is output 650.

Figure 7:
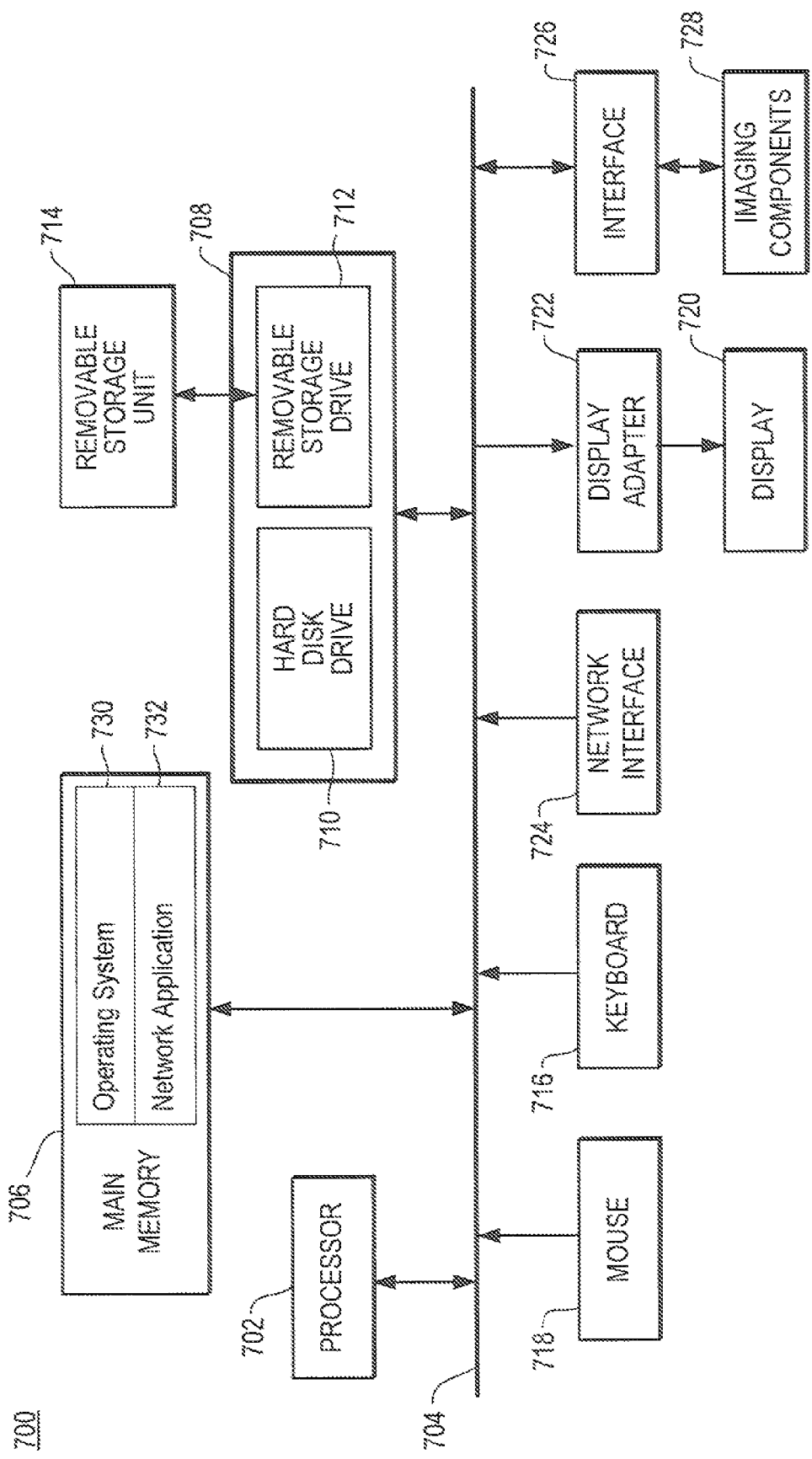
FIG. 7 shows a computer system for implementing the method shown in FIG. 2 described in accordance with examples of the present invention.

FIG. 7 shows a computer system for implementing the method shown in FIG. 2 described in accordance with examples of the present invention.

The computing apparatus 700 includes one or more processor(s) 702 that may implement or execute some or all of the steps described in the method 200. Commands and data from the processor 702 are communicated over a communication bus 704. The computing apparatus 700 also includes a main memory 706, such as a random access memory (RAM), where the program code for the processor 702, may be executed during runtime, and a secondary memory 708. The secondary memory 708 includes, for example, one or more hard drives 710 and/or a removable storage drive 712, representing a removable flash memory card, etc., where a copy of the program code for the method 200 may be stored. The removable storage drive 712 reads from and/or writes to a removable storage unit 714 in a well-known manner.

These methods, functions and other steps described may be embodied as machine readable instructions stored on one or more computer readable mediums, which may be non-transitory. Exemplary non-transitory computer readable storage devices that may be used to implement the present invention include but are not limited to conventional computer system RAM, ROM, EPROM, EEPROM and magnetic or optical disks or tapes. Concrete examples of the foregoing include distribution of the programs on a CD ROM or via Internet download. In a sense, the Internet itself is a computer readable medium. The same is true of computer networks in general. It is therefore to be understood that any interfacing device and/or system capable of executing the functions of the above-described examples are encompassed by the present invention.

Although shown stored on main memory 706, any of the memory components described 706, 708, 714 may also store an operating system 730, such as Mac OS, MS Windows, Unix, or Linux; network applications 732; and a display controller component 730. The operating system 730 may be multi-participant, multiprocessing, multitasking, multi-threading, real-time and the like. The operating system 730 may also perform basic tasks such as recognizing input from input devices, such as a keyboard or a keypad; sending output to the display 720; controlling peripheral devices, such as disk drives, printers, image capture device; and managing traffic on the one or more buses 704. The network applications 732 includes various components for establishing and maintaining network connections, such as software for implementing communication protocols including TCP/IP, HTTP, Ethernet, USB, and FireWire.

The computing apparatus 700 may also include an input devices 716, such as a keyboard, a keypad, functional keys, etc., a pointing device, such as a tracking ball, cursors, mouse 718, etc., and a display(s) 720. A display adaptor 722 may interface with the communication bus 704 and the display 720 and may receive display data from the processor 702 and convert the display data into display commands for the display 720.

The processor(s) 702 may communicate over a network, for instance, a cellular network, the Internet, LAN, etc., through one or more network interfaces 724 such as a Local Area Network LAN, a wireless 402.11x LAN, a 3G mobile WAN or a WiMax WAN. In addition, an interface 726 may be used to receive an image or sequence of images from imaging components 728, such as the image capture device.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

What is claimed is:

1. A system for generating explanatory summaries, comprising:
   a processor; and a memory storing instructions executable by the processor, the instructions to:
   obtain a first topic label and a first data set, the first topic label comprising a plurality of words for which an explanatory summary should be generated;
   extract features from the first data set;
   modify the first topic label to generate a second topic label;
   evaluate discriminativeness of the extracted features by comparing the first data set to a second data set that is related to the second topic label;
   generate a first ranked list of the extracted features based on the discriminativeness;
   determine, for each extracted feature, whether the each extracted feature includes at least one of the plurality of words;
   in response to determining that the each extracted feature includes the at least one of the plurality of words, exclude the each extracted feature from the extracted features that are being ranked;
   generate the explanatory summary by including the top N extracted features of the first ranked list in the explanatory summary; and
   output the explanatory summary.

2. The system of claim 1, wherein the instructions are further to perform at least one of: an evaluation of popularity of each feature of the extracted features and a discourse analysis on the each feature of the extracted features.

3. The system of claim 2, wherein the instructions are further to:
   generate a second ranked list of the extracted features based on at least one of the popularity and the discourse analysis; and
   merge the first ranked list and the second ranked list to generate a third ranked list.

4. A non-transitory computer readable storage medium having computer readable program instructions stored thereon for causing a computer system to perform the instructions, the instructions comprising the steps of:
   obtaining a topic label and a first data set, the topic label comprising at least one dimension and a word that corresponds to the at least one dimension;
   extracting features from the first data set;
   evaluating explanatoriness of the extracted features, wherein evaluating the explanatoriness of the extracted features includes the step of evaluating popularity of the extracted features and evaluating discriminativeness of the extracted features by comparing the first data set to a second data set that is related to a modified topic label, wherein the modified topic label is generated based on the topic label;
ranking the extracted features based on the explanatoriness evaluation;
determining, for each extracted feature, whether the each extracted feature includes the word; and
in response to determining that the each extracted feature includes the word, excluding the each extracted feature from the extracted features that are being ranked;
generating a explanatory summary by including the top N extracted features of the extracted features that are being ranked in the explanatory summary; and
outputting the explanatory summary.

5. The computer readable storage medium of claim 4, further comprising the steps of:
evaluating the explanatoriness of the extracted features based on a criteria that is different from at least one of the popularity and the discriminativeness;
ranking the extracted features based on the criteria; and
merging the ranking based on the criteria and the ranking based on at least one of the popularity and the discriminativeness.

6. The computer readable storage medium of claim 4, wherein what text is included in the summary is based on at least the ranking.

7. The computer readable storage medium of claim 4, wherein the second data set is a set of comparable data.

8. The computer readable storage medium of claim 4, wherein the second data set is a set of background data.

9. A method for generating explanatory summaries, the method comprising:
obtaining a topic label and a first data set, the topic label comprising at least one dimension and a word that corresponds to the at least one dimension;
extracting features from the first data set;
evaluating explanatoriness of the extracted features, wherein evaluating the explanatories of the extracted features includes at least one of the step of evaluating popularity of the extracted features and evaluating discriminativeness of the extracted features by comparing the first data set to a second data set that is related to a modified topic label, wherein the modified topic label is generated based on the topic label;
ranking the extracted features based on the explanatoriness evaluation;
determining, for each extracted feature, whether the each extracted feature includes the word; and
in response to determining that the each extracted feature includes the word, excluding the each extracted feature from the extracted features that are being ranked;
generating a explanatory summary by including the top N extracted features of the extracted features that are being ranked in the explanatory summary; and
outputting the explanatory summary.

10. The method of claim 9, further comprising:
evaluating the explanatoriness of the extracted features based on a criteria that is different from the comparison of the first data set to the second data set;
ranking the extracted features based on the criteria; and
merging the ranking based on the comparison and the ranking based on the criteria.

11. The method of claim 9, wherein the topic label comprises at least two dimensions, wherein the second data set comprises comparable data, and wherein the method further comprises:
generating the modified topic label by replacing a word corresponding to one of the at least two dimensions with another word; and
obtaining the comparable data that is related to the modified topic label.

12. The method of claim 9, wherein the topic label comprises at least two dimensions, wherein the second data set comprises background data, and wherein the method further comprises:
generating the modified topic label by eliminating a dimension from the at least two dimensions; and
obtaining the background data that is related to the modified topic label.

13. The method of claim 11, wherein comparing the first data set to the comparable data further comprises determining whether a feature of the extracted features is more frequent in the first data set than the comparable data.

14. The method of claim 12, wherein comparing the first data set to the background data further comprises determining whether a feature of the extracted features is more frequent in the first data set than the background data.

15. The method of claim 9, further comprising evaluating the explanatoriness of the extracted features by performing discourse analysis.

* * * * *

UNITED STATES PATENT AND TRADEMARK OFFICE
CERTIFICATE OF CORRECTION

PATENT NO.        : 9,189,470 B2                                            Page 1 of 1
APPLICATION NO.   : 13/485730
DATED             : November 17, 2015
INVENTOR(S)       : Hyun Duk Kim et al.

It is certified that error appears in the above-identified patent and that said Letters Patent is hereby corrected as shown below:

IN THE CLAIMS

In column 12, line 64, in Claim 4, delete "explanatoriness" and insert -- explanatories --, therefor.

In column 12, line 65, in Claim 4, delete "includes the" and insert -- includes at least one of the --, therefor.

Signed and Sealed this
Fifth Day of April, 2016

Michelle K. Lee
*Director of the United States Patent and Trademark Office*